United States Patent

Gowing et al.

(10) Patent No.: US 8,899,524 B2
(45) Date of Patent: Dec. 2, 2014

(54) AIRCRAFT CABIN DOOR PRESSURE VENT SYSTEM

(71) Applicant: Textron Innovations Inc., Providence, RI (US)

(72) Inventors: Greg Gowing, Goddard, KS (US); Scott Weber, Goddard, KS (US); Elisabeth Archibald, Wichita, KS (US); Shad Plante, Wichita, KS (US); Matt Wiley, Greensboro, NC (US)

(73) Assignee: Textron Innovations, Inc., Providence, RI (US)

( * ) Notice: Subject to any disclaimer, the term of this patent is extended or adjusted under 35 U.S.C. 154(b) by 0 days.

(21) Appl. No.: 13/846,512

(22) Filed: Mar. 18, 2013

(65) Prior Publication Data

US 2013/0327892 A1    Dec. 12, 2013

Related U.S. Application Data

(63) Continuation of application No. 12/874,061, filed on Sep. 1, 2010, now Pat. No. 8,403,265.

(60) Provisional application No. 61/238,785, filed on Sep. 1, 2009.

(51) Int. Cl.
    *B64C 1/14* (2006.01)

(52) U.S. Cl.
    CPC ............. *B64C 1/1461* (2013.01); *B64C 1/1407* (2013.01); *B64C 1/143* (2013.01); *B64C 1/14* (2013.01)
    USPC ...................................................... 244/129.5

(58) Field of Classification Search
    USPC ............ 244/118.5, 129.4, 129.5; 49/394, 395
    See application file for complete search history.

(56) References Cited

U.S. PATENT DOCUMENTS

| | | | |
|---|---|---|---|
| 2,748,855 A | 6/1956 | Siems et al. | |
| 4,473,201 A | 9/1984 | Barnes et al. | |
| 4,720,065 A | 1/1988 | Hamatani | |
| 5,305,969 A * | 4/1994 | Odell et al. | 244/129.5 |
| 5,337,977 A | 8/1994 | Fleming et al. | |
| 5,823,473 A | 10/1998 | Odel et al. | |
| 5,931,415 A | 8/1999 | Lingard et al. | |
| 6,454,210 B1 | 9/2002 | Plattner | |
| 6,457,675 B1 | 10/2002 | Plude et al. | |
| 7,207,524 B2 | 4/2007 | Puschmann et al. | |
| 2007/0164572 A9 * | 7/2007 | Pratt et al. | 292/227 |

OTHER PUBLICATIONS

Select File History from related U.S. Appl. No. 12/874,061, dated Sep. 11, 2012 through Nov. 19, 2012, 15 pages.

* cited by examiner

*Primary Examiner* — Philip J Bonzell
*Assistant Examiner* — Nicholas McFall
(74) *Attorney, Agent, or Firm* — Lathrop & Gage LLP

(57) ABSTRACT

Disclosed is an aircraft door including a handle-activated pressure relief system that avoids potentially dangerous pressure differences between the cabin and the atmosphere outside the aircraft. A flow path is created between the inboard and outboard handles on the door. A pressure vent door is located in the flow path. The vent door being is opened when either of the inboard and outboard handle assemblies are activated. Once either handle is rotated beyond a particular point, a spring in the supporting mechanics becomes overcenter. At the same time, the vent door comes under the influence of a magnet, snapping the vent open. After the door has been opened, it can be relatched by operating the handles in the reverse direction. The magnet and spring hold the vent door open until the aircraft door is fully latched, sealed, and secured. Only then does the vent door sealingly close.

8 Claims, 15 Drawing Sheets

AIRCRAFT CABIN DOOR PRESSURE VENT SYSTEM

CROSS-REFERENCE TO RELATED APPLICATIONS

This application is a continuation of U.S. patent application Ser. No. 12/874,061, filed Sep. 1, 2010 which claims the benefit of U.S. Provisional Application No. 61/238,785 filed Sep. 1, 2009, the entire contents of which are herein incorporated by reference.

BACKGROUND OF THE INVENTION

1. Field of the Invention

The invention relates generally to methods of aircraft door design and safety. More specifically, the invention relates to the field of releasing air to drop cabin pressure prior to or instantaneously upon the opening of a door.

2. Description of the Related Art

It is known in the art to include a door vent in an aircraft door. Normally this type of arrangement includes a vent door that is located remotely from the door handle. In many cases the handle is mechanically connected to the vent door to cause it to open when the door is opened. See e.g., U.S. Pat. No. 6,457,675 issued to Plude et al.; U.S. Pat. No. 5,931,415 issued to Lingard et al.; U.S. Pat. No. 6,454,210 issued to Plattner; U.S. Pat. No. 5,823,473 issued to Odell et al.; U.S. Pat. No. 5,305,969 issued to Odell et al.; U.S. Pat. No. 4,473,201 issued to Barnes et al.; U.S. Pat. No. 5,337,977 issued to Fleming et al.; U.S. Pat. No. 7,207,524 issued to Puschman et al.; U.S. Pat. No. 4,720,065 issued to Hamatani; and U.S. Pat. No. 2,748,855 issued to Siems et al.

SUMMARY

The present invention is defined by the claims below. Embodiments of the disclosed systems and methods include arrangements used to relieve cabin pressure before or instantaneously upon opening an aircraft door.

In one embodiment, an aircraft door includes an inboard handle assembly and an outboard handle assembly. A flow path is created for allowing air to pass into the inboard handle assembly and then out of the outboard handle assembly. In another embodiment a pressure vent door is located in the flow path. The vent door being is opened when either of the inboard and outboard handle assemblies are operated. When the vent door is opened, pressure is released from the cabin.

In some embodiments the inboard handle assembly includes a plurality of slots created by standoffs included between an interior surface of the aircraft and the handle assembly. The slots are a part of the flow path created. In embodiments the outboard handle assembly includes an air-exhausting aperture, and a plurality of smaller apertures located underneath a release pawl to allow air to be directed outward from the handle assembly.

Another embodiment is a pressure relief system for an aircraft door that has a door handle mechanically connected to cause rotation of a first shaft when activated. The rotation of the first shaft adapted to open a pressure vent. A spring closes the pressure vent when either under-center or over-center, and opens the pressure vent when returned to either under-center or over-center position. In embodiments the pressure vent is on a pivot, a magnet holds the pressure vent in open position after the handle is pulled, and the magnet releases the pressure vent only when the handle is returned and the door is closed.

In some embodiments a backbone, or spine member is translated upon rotation of the first shaft. The backbone member then causes rotation in a second shaft. A lever is provided on the second shaft. In this embodiment, the lever determines whether the spring is in an over-center or under-center position depending on an angular position of the lever.

Another embodiment is a method. More specifically, a process for avoiding an unsafe pressure differential between the outside and inside of an aircraft door. This method includes the steps of: (i) locating an inboard handle in an inboard handle housing on the inboard of the aircraft door; (ii) locating an outboard handle in an outboard handle housing on the outboard side of the aircraft door; (iii) creating a ventable airpath through both the inboard and outboard handle housings; and (iv) causing the airpath to open upon activation of either of the inboard or outboard handles. In one version the airpath remains open unless the door is secured as a safety feature. In another possible variation of the vent door, the handle, when released, opens up abruptly to release. The release can be triggered using the angular position of a spring to cause it to become over-center and create a reverse in leverage.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and a method for relieving cabin pressure in an aircraft prior to or instantaneously upon the door being opened, but before the door becomes unlatched. Additionally, vent door system disclosed keeps cabin pressure below a certain acceptable level (e.g., 0.5 psig cabin pressure differential) if the door is not fully closed, latched, and locked. The vent door assembly was designed to meet this maximum cabin differential pressure criterion (e.g., 0.5 psig) up to an aircraft altitude of 15,000 feet, which is the most critical altitude. This is accomplished by mechanically driving the pressure-vent door to open and close in response to upward and downward translations of a backbone which is used to trigger the door latches of the aircraft.

The vent door is sequenced to be the last element to move into position when the system moves into the latched and locked state, and the first component to move in the open direction as the system moves into the unlatched and unlocked position. Thus, upon opening, the pressure is relieved prior to or instantaneously upon unlatching of door. Also, because the vent door is the last element to be moved into position when the door is latched, any failures to completely close the door will be detected by the pilot as a lack of cabin pressure since the vent will remain open unless there is proper closure.

Another feature of the disclosed system causes the vent door to remain open if there is a mechanical failure in the door opener system. In one embodiment, this subsystem incorporates a magnet which retains the door in open position until acted on by a return force.

Another desirable result of venting through the existing door handles is that there is no need for an additional pressure vent arrangement. Conventional arrangements, in some cases, include vent doors which are handle activated. These arrangements, however, typically necessitate a vent door which is located in some other place on the outside of the aircraft. This type of exterior door creates unnecessary drag. In some instances, the aircraft exterior is modified to minimize these aerodynamic effects, but this type of fix (e.g., extending fairings) normally results in undesirable weight increases. Thus, creating a handle-to-handle air vent enables the outside of the aircraft to be streamlined to a greater extent, and results in overall weight reduction.

System Environment

Figure 1:
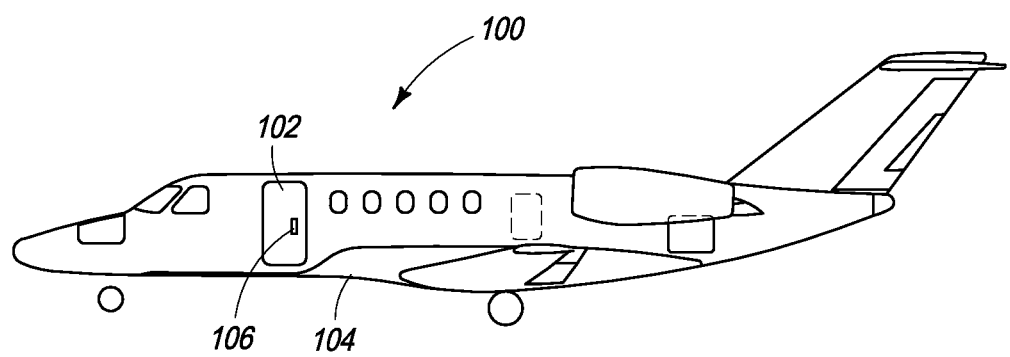
FIG. 1 is side view of an aircraft in which embodiments of the disclosed systems could be used.

FIG. 1 shows an aircraft 100 having a door 102 with a handle 106 in which the disclosed venting systems can be utilized. Referring to the figure, the particular door 102 is a fuselage door. Immediately behind and below door 102 is a fairing 104. Fairing 104 is a protective shell formed over rough equipment in order to maintain a smooth aerodynamic exterior.

Figure 2:
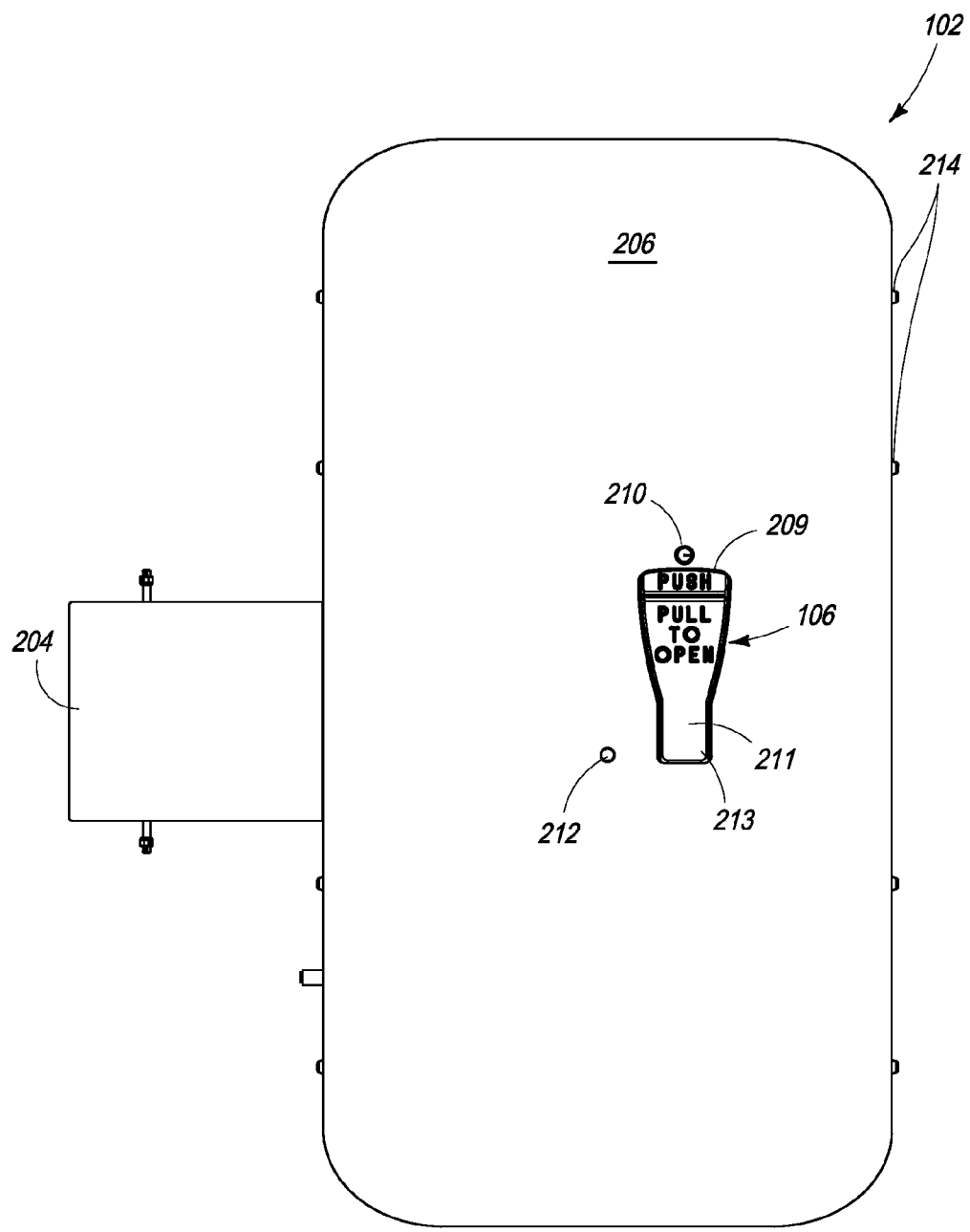
FIG. 2 is an inboard view of a full aircraft door in which embodiments of the disclosed systems could be used taken from a perspective that is outside the aircraft.

Referring now to FIG. 2, it can be seen that the outside of door 102 includes a concealed hinge support 204 which not only secures door 102 within a doorway defined in the walls of aircraft 100 (doorway not shown), but enables the door to open outwards. Defined into an outer surface 206 on the outside of door 102 is an outboard handle assembly 106 having a key operated lock 210. A sight glass 212 enables the viewer to see an internal warning flag that, if missing, indicates possible failures in operation. Handle assembly 106 is included in a housing 213.

Those skilled in the art will recognize that handle assembly 106 is the sort that has an upper release pawl 209 which, when depressed, releases a lower lever portion 211 of the handle 106. Once lever 211 has been unlatched, it can be rotated out and down towards the position shown in FIG. 9. This rotation causes a plurality of securing latching members 214 on the outside of the door to retract laterally inward, and thus, be drawn out of reciprocating receptacles (not shown) in the surrounding frame structures which define the door opening. The retraction of members 214 out of the door frame enables the door to be opened.

Figure 3:
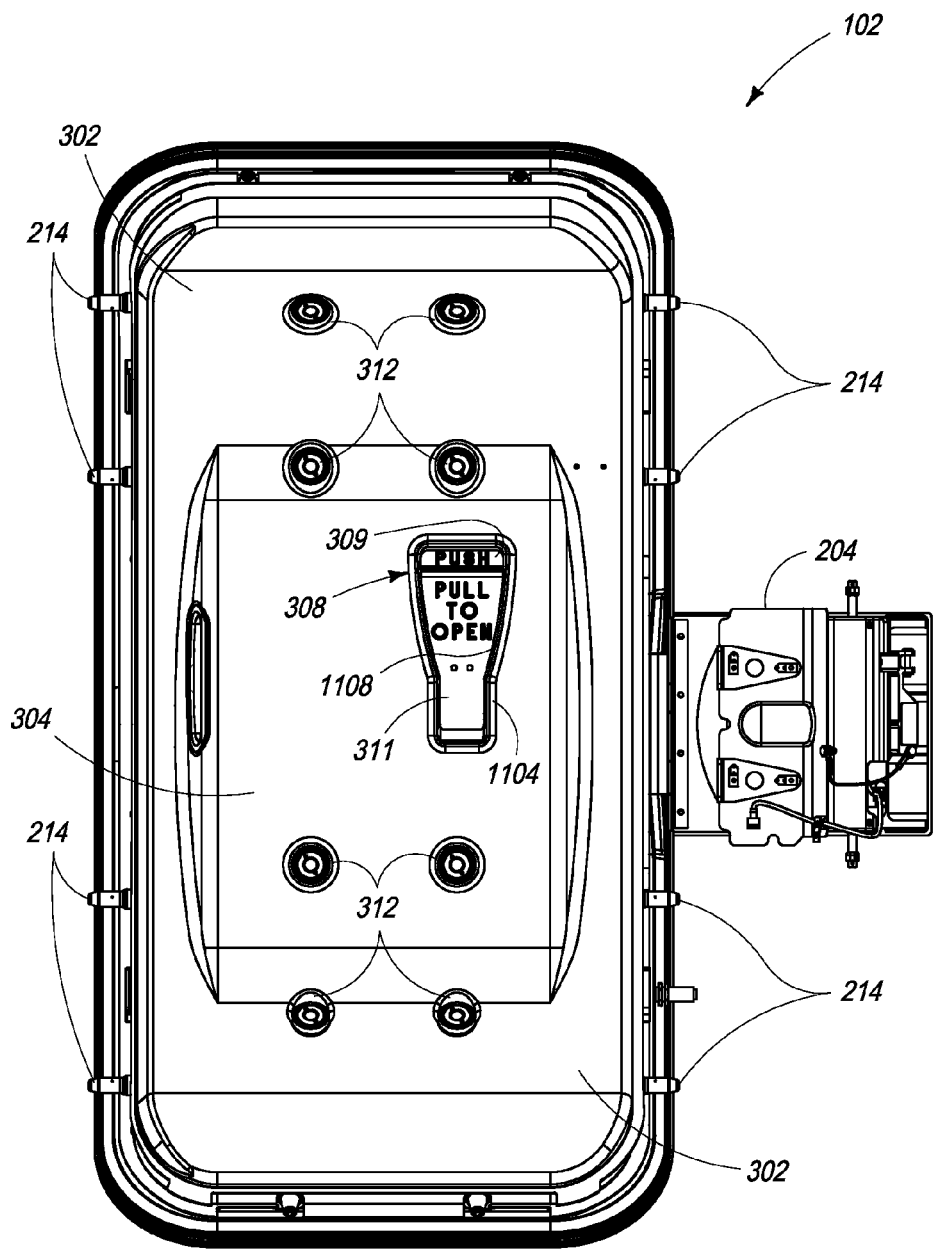
FIG. 3 is an outboard view of the aircraft door from inside the aircraft.

FIG. 3 shows the door as viewed from the inside of the aircraft. Hinged support 204 and securing latch members 214 can also be seen in this view. Also shown is an inside cover 302. The upper and lower portions of cover 302 follow the contour of the aircraft, but towards the middle of the door, an outcropped portion 304 of the cover 302 extends up and down in a substantially vertical plane and includes an inboard door handle assembly 308. Like with the outboard handle, inboard handle assembly 308 is included in a housing and has an upper portion that is an upper release pawl 309 which when depressed releases a lower lever portion 311 of the handle assembly 308. Once inboard lever 311 has been unlatched, it can be rotated out and down. Like with the outboard lever 211, pulling inboard lever 311 causes the securing latch members 214 to retract out of reciprocating receptacles (not shown) in the surrounding door structures (not shown). This enables the door to be opened from the inside. The inside door has many more sight glasses 312 than does the door on the outside. Again, these enable the user to see flags, the absence of which are an indication of malfunction.

Figure 4:
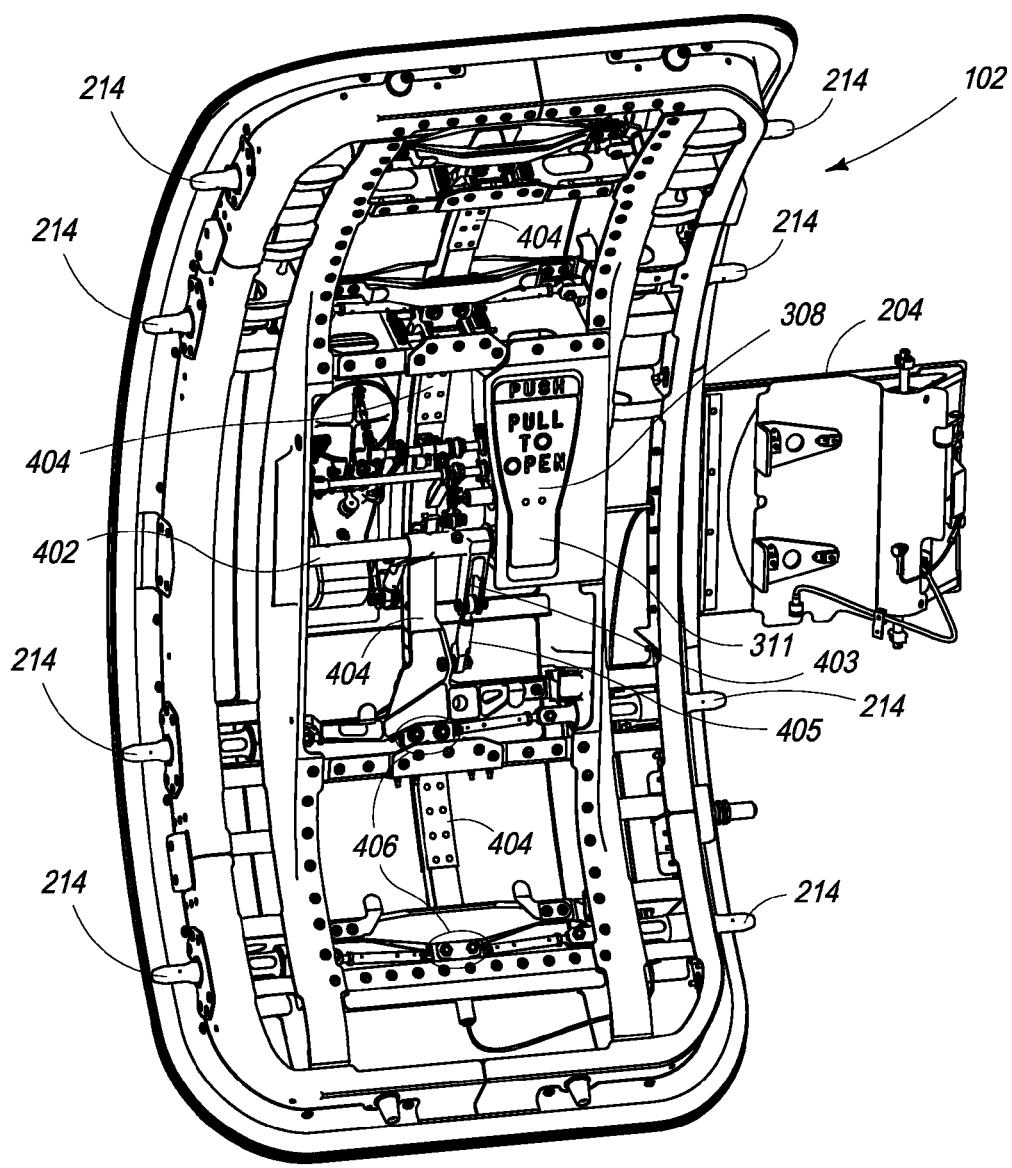
FIG. 4 is an outboard view of the aircraft door from inside the aircraft with the door cover panel removed to reveal the internals.
Figure 5:
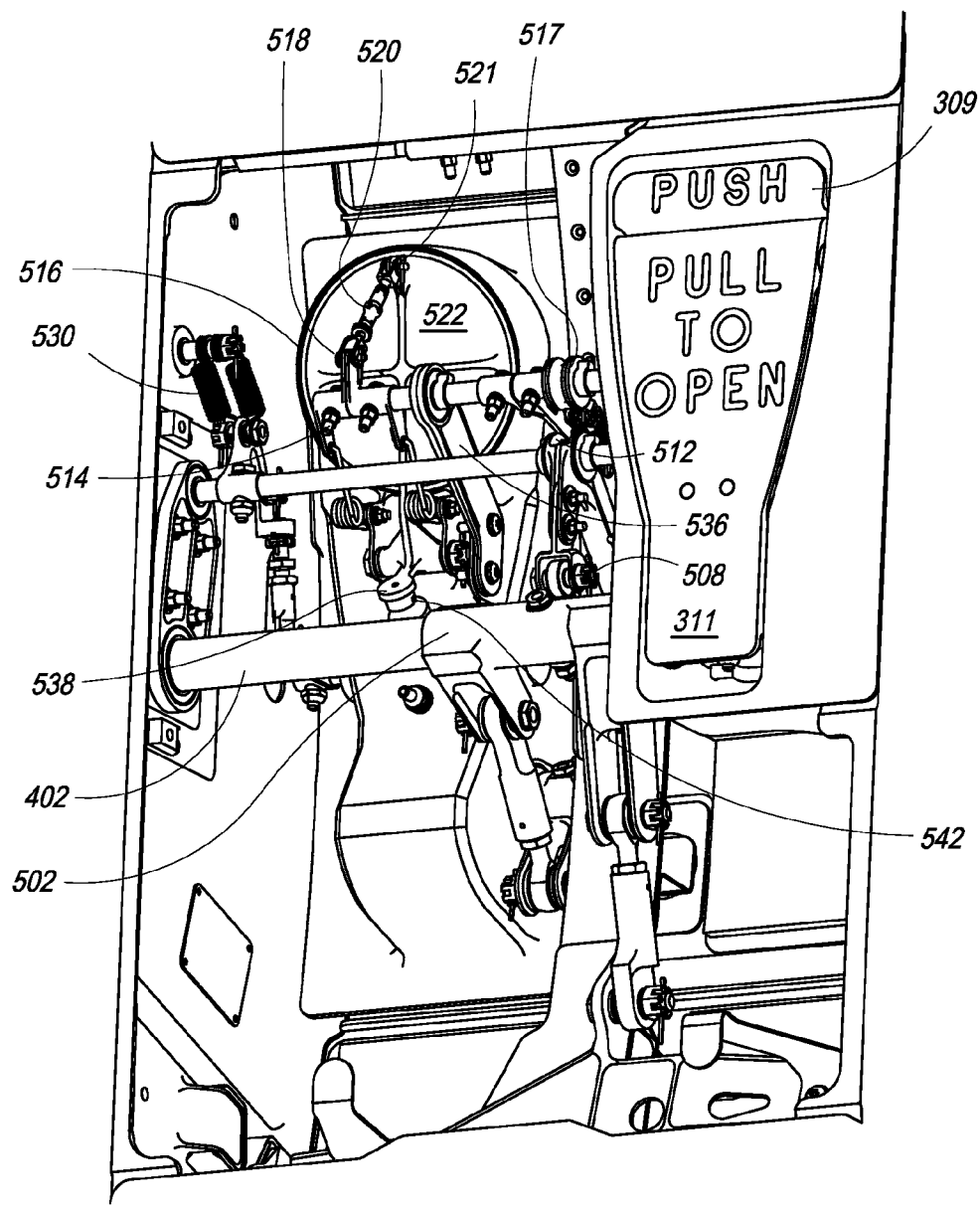
FIG. 5 is a perspective view of one embodiment for the inside door handle assembly of the present invention from inside where the vent door is in a closed position.

FIG. 4 shows the inside of the door 102 from the same perspective as shown in FIG. 3, but with the cover portion 202 removed to reveal the mechanical arrangement hidden behind it. Referring to FIG. 3, lever 311 when rotated out and down causes a drive shaft 402 to rotate. When this occurs, linkage 403 rotates inward (see also FIG. 7) putting component 405 in tension thus causing a vertical member/backbone 404 to be driven upward causing a plurality of hinged lateral tension members 406 (see FIG. 4) to mechanically pull the securing latches 214 inward from the receptacles in the surrounding door structures, and the door may thus, be opened.

The Pressure Vent System

The ventilation arrangement is shown in detail in FIGS. 5-10. Referring first to FIGS. 5-8, an internal mechanical arrangement is shown which causes the opening of a pressure vent door 522 upon the unlatching and pulling either of outboard lever 211 or inboard lever 311. More specifically, when either of levers 211 or 311 is rotated out and down, the door is unlatched and also vented. When the door is then closed and relatched, pressure vent door remains open until the securing latches 214 are fully secured into receiving areas created in surrounding door structures (not shown). Once the latches 214 are completely secured into the surrounding door housing, then the vent door 522 shuts and seals completely enabling pressurization of the cabin.

Handle-to-Handle Mechanical Link

Figure 7A:
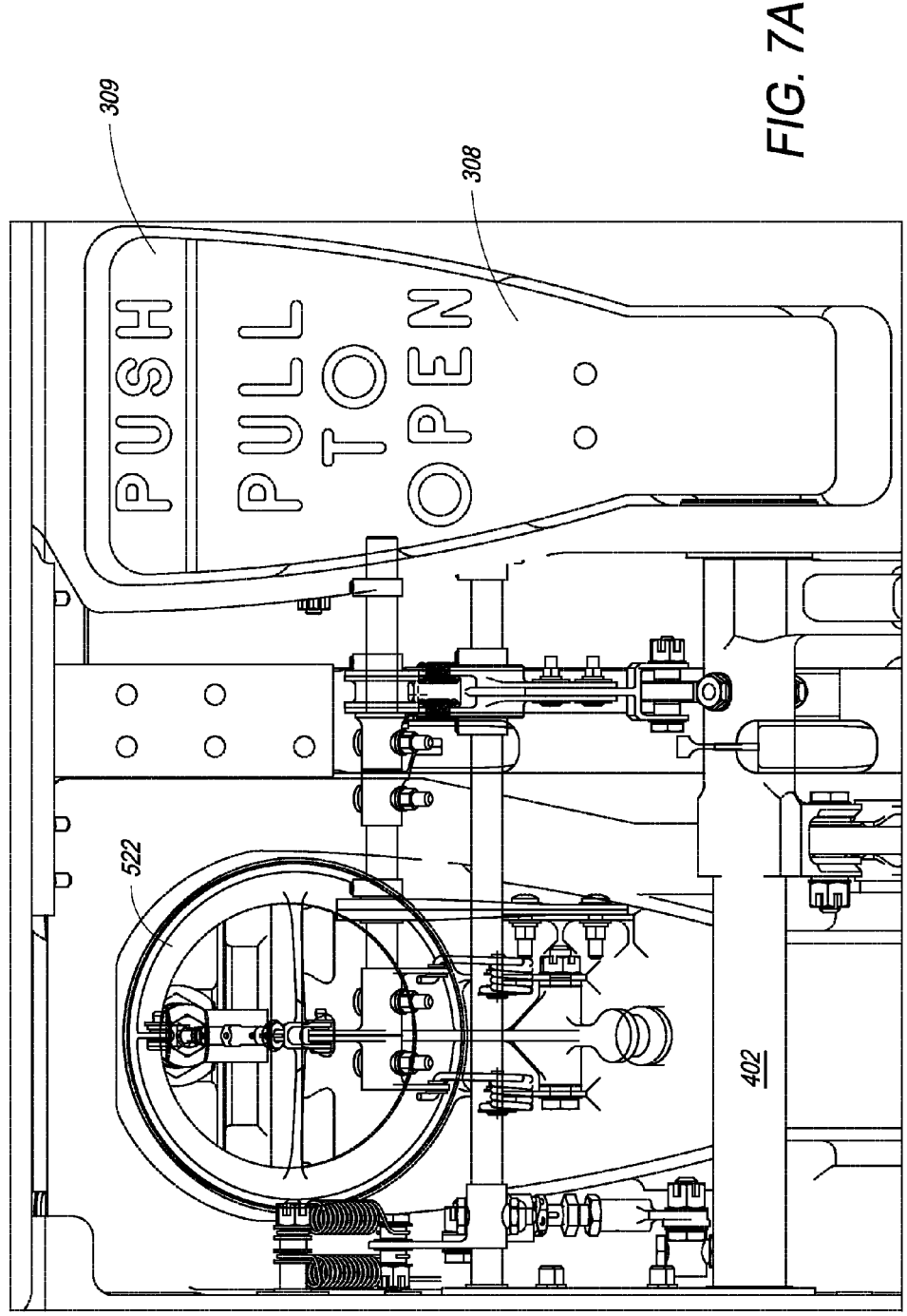
FIG. 7A shows a front view of the internals of the disclosed embodiment of the cabin door vent system.
Figure 7B:
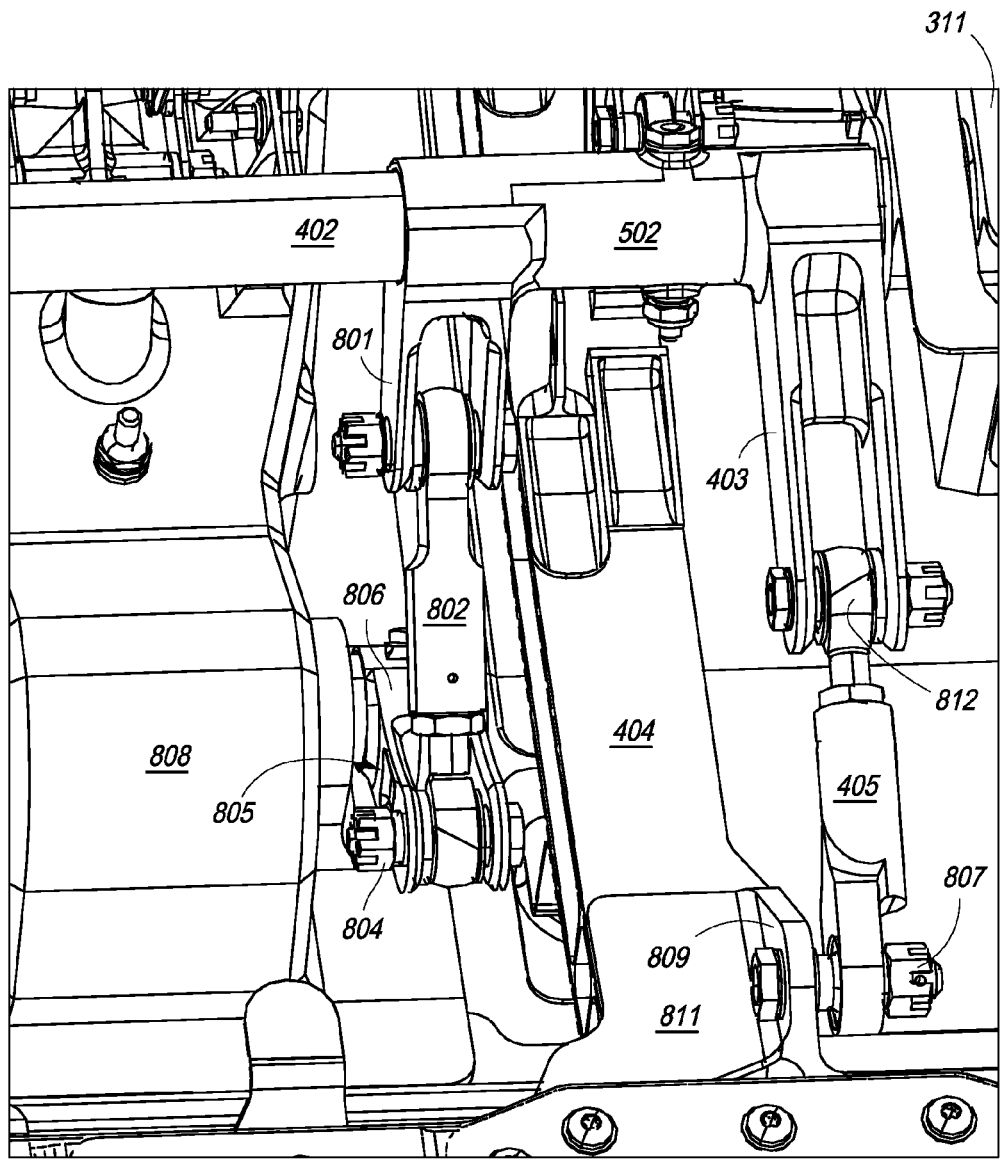
FIG. 7B shows a perspective view from below highlighting a handle-to-handle mechanical linking system of disclosed embodiment for the cabin door vent system.

Referring to FIG. 7B, it can be seen that outboard lever 211 is linked to inboard lever 311 as follows. The lower portion of lever 311 is connected to shaft 402. When a user pulls inboard lever 311, shaft 402 rotates outward and down. Collar 502, which is mounted onto and rotates with shaft 402. A fork 801 on collar 502 rotates into the page and up (as seen in FIG. 7B). The top of a push rod 802, which is pin linked to, and depends down from fork 801, will move upward and into the page (see FIG. 7B) when handle 311 is thrown. The bottom of push rod 802 is pin linked (via pivot link 804) to a receiving fork 805. Thus, the upward movement of rod 802 results in the rotation of receiving fork 805 about a shaft (not shown, but is inside of the lower portion 808 of the outboard handle housing as shown in FIG. 7B) which is linked at the bottom of outboard handle 211.

When a user pulls outboard handle 211, the opposite actions occur in that receiving fork 805 rotates upward pushing rod 802 upward against the pin connection on forked extension 801 on collar 502. This causes shaft 402 to rotate such that handle 311 is rotated outward. Thus, the two handles are coupled to, and can both be activated to rotate common shaft 402. Also, they are live handles in that they rotationally open and close together.

Pressure-Vent-Operating System

The pulling of either the inboard or outboard handles will also result in the opening of pressure relief door vent 522. As discussed already, the two levers 211 and 311 move together, and when either is thrown, shaft 402 and collar 502 are driven in a counter clockwise direction (when looking outward from an inboard position as shown in FIG. 7B). Collar 502 also has a second fork 403 which depends downward and makes a pin connection 812 with a tension link 405. Thus, upon the counter-clockwise rotation of collar 502 upon throwing of either lever (211 or 311), tension link 405 will be pulled upward. Link 405, at the bottom has a pin connection 807 to a flange 809 on a bracket 811 (see FIG. 7B) which is part of a backbone 404. Backbone 404, therefore, moves upward when either of levers 211 or 311 are pulled.

As explained already, when backbone 404 is translated upward upon lever activation, it causes the retraction of latches 214 (see FIGS. 2 and 3) which allows the door to be opened when the latches are fully retracted. This backbone translation is also utilized to open the pressure vent door 522 to safely release cabin pressure before the aircraft cabin door 102 is opened at all.

Figure 7C:
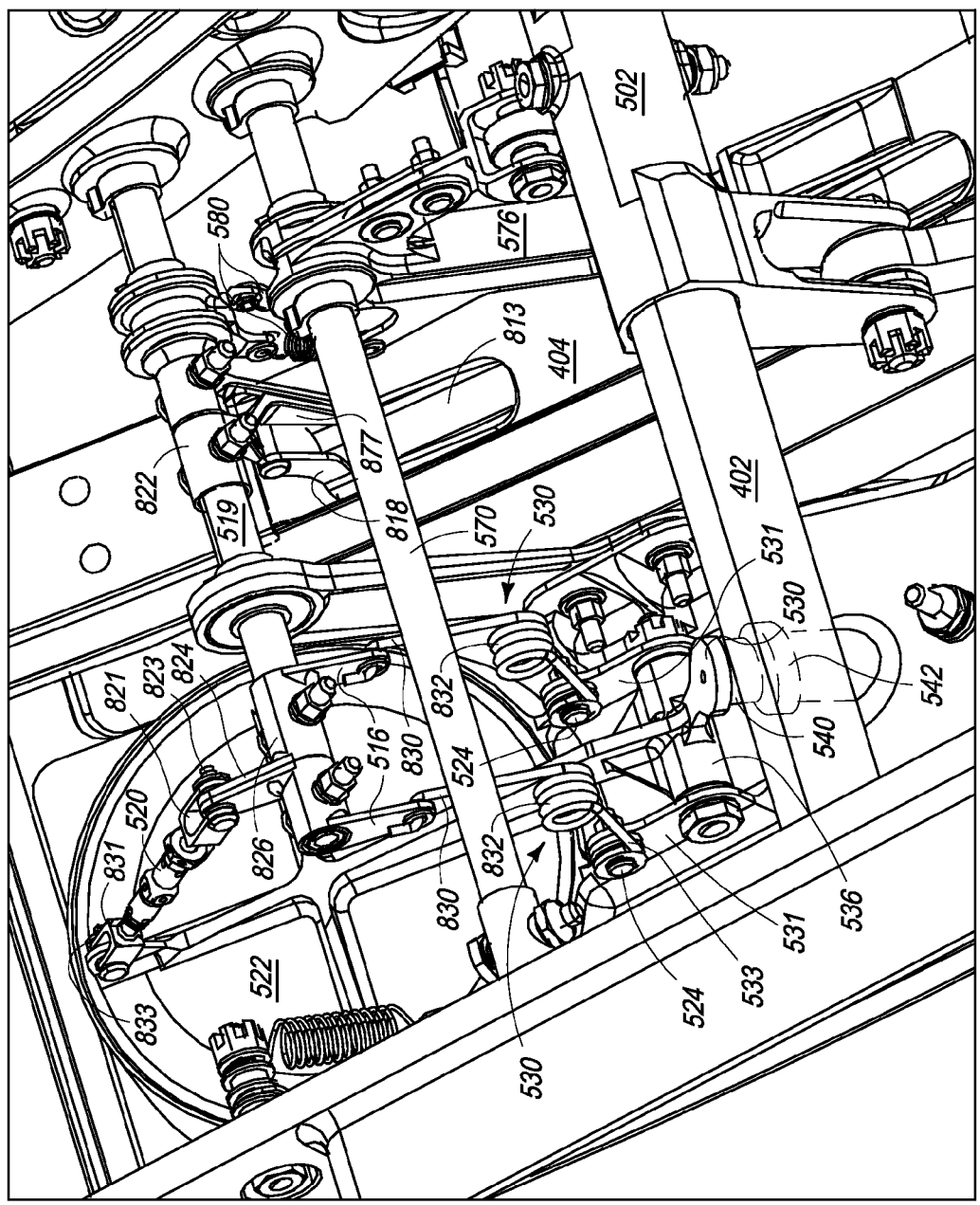
FIG. 7C shows a perspective view from slightly below and left highlighting the mechanical over-center vent control system of the disclosed embodiment.
Figure 7D:
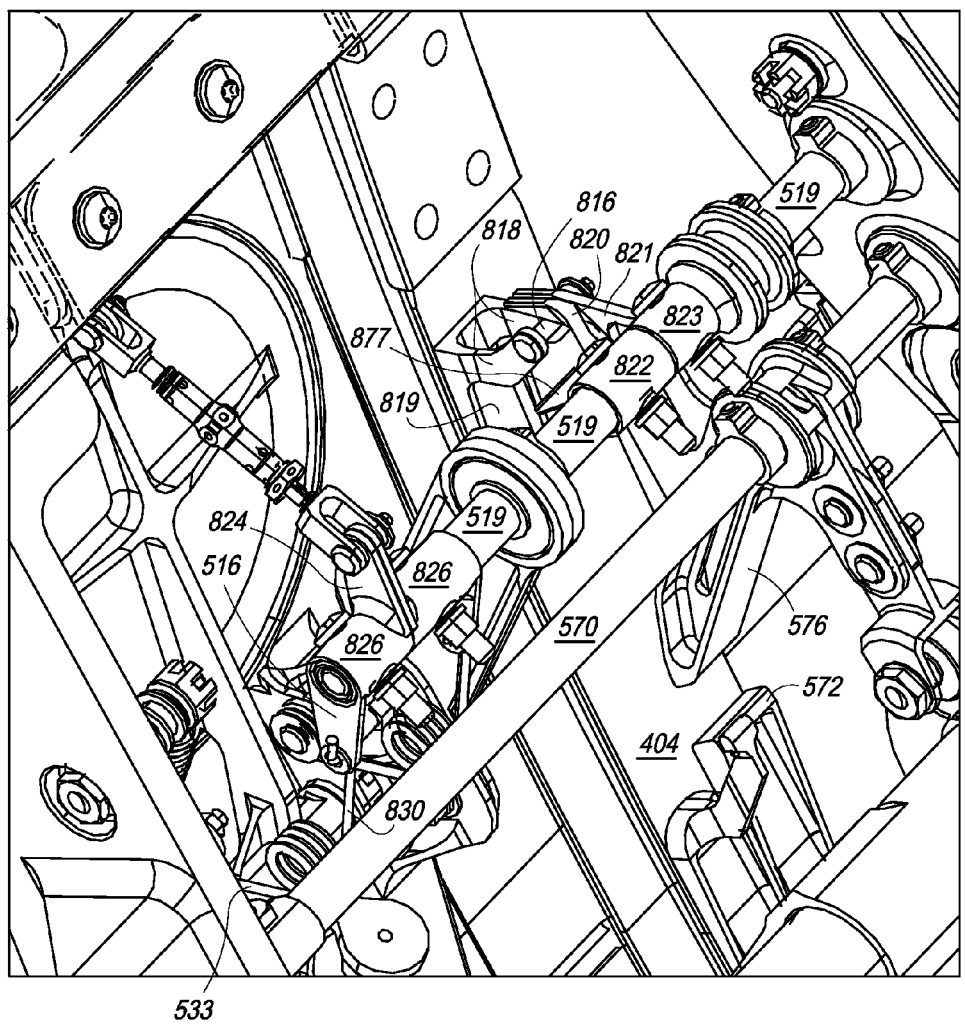
FIG. 7D shows a perspective view from above left which reveals the mechanical systems which use the translation of the door backbone to cause the opening and closing of the disclosed embodiment.

As can be seen in FIGS. 7C and 7D, the upward translation of backbone 404 upon the activation of either handle 211 or 311 opens the pressure vent door 522 using an additional mechanical system. A laterally extended pin 816 (See FIG. 7D) on the backbone 404 engages integrated catch portions 820 and 821 associated with collars 822 and 823, respectively. Collars 822 and 823 are bolted to vent drive shaft 519. The pin is fixed atop bifurcated mounts 818 on a bracket 819 that is located on the backbone 404. The pin 816 is position along backbone 404 in a position such that it engages the catches after the backbone has already been displaced upward a slight distance. Thus, the engagement of the catch portions 820 and 821 is not immediate, but delayed slightly. Upon engagement of the catches 820 and 821 (after backbone 404 has translated upward the slight distance), the resulting rotation of shaft 519 causes a pair of upwardly (and inwardly) extending integrated levers 824 (See now FIG. 7C) on collars 826 to rotate out. This puts member 520, which pivotally connected between an upper portion of the door 522 using a pin 833/fork 831 arrangement and the integrated lever 824 using a similar pin 823/fork 829 arrangement, in tension.

This tension created enables pressure vent door 522 to pivot open. Conversely, the door 522 will shut if and when the backbone translates downward. Thus, the door can be moved between open and shut positions depending on backbone 404 translation, since the pressure vent door 522 is hinged. The specifics regarding the hinge mount for the door 522 can best be seen in FIG. 7C. The door is hinged using a short pivot axle 536 mounted between two flanges 531 that extend out of the frame.

Thus, these features enable the pressure vent system to operate in open and closed modes. The closed mode exists when the handles are in the upright positions shown in FIGS. 2-5. Conventionally, this type of handle includes a latching mechanism, e.g., release pawls 209 and 309, which must be pushed in to release the levers, e.g., levers 211 and 311 respectively. These latches also enable the levers to be secured back into a secured position. When either of levers 211 or 311 is unlatched and then rotated down, the system will be placed into the open mode shown in FIG. 6. In terms of semantics, this second "open" mode should be construed as meaning any mode in which the pressure vent is opened at all—even minimally. By "closed mode," it is meant that the pressure vent system is substantially sealed in a manner that enables cabin pressure to be maintained to an acceptable extent. Any specific degree of openness or closure is not intended in these meanings.

The Over-Center System

Figure 6:
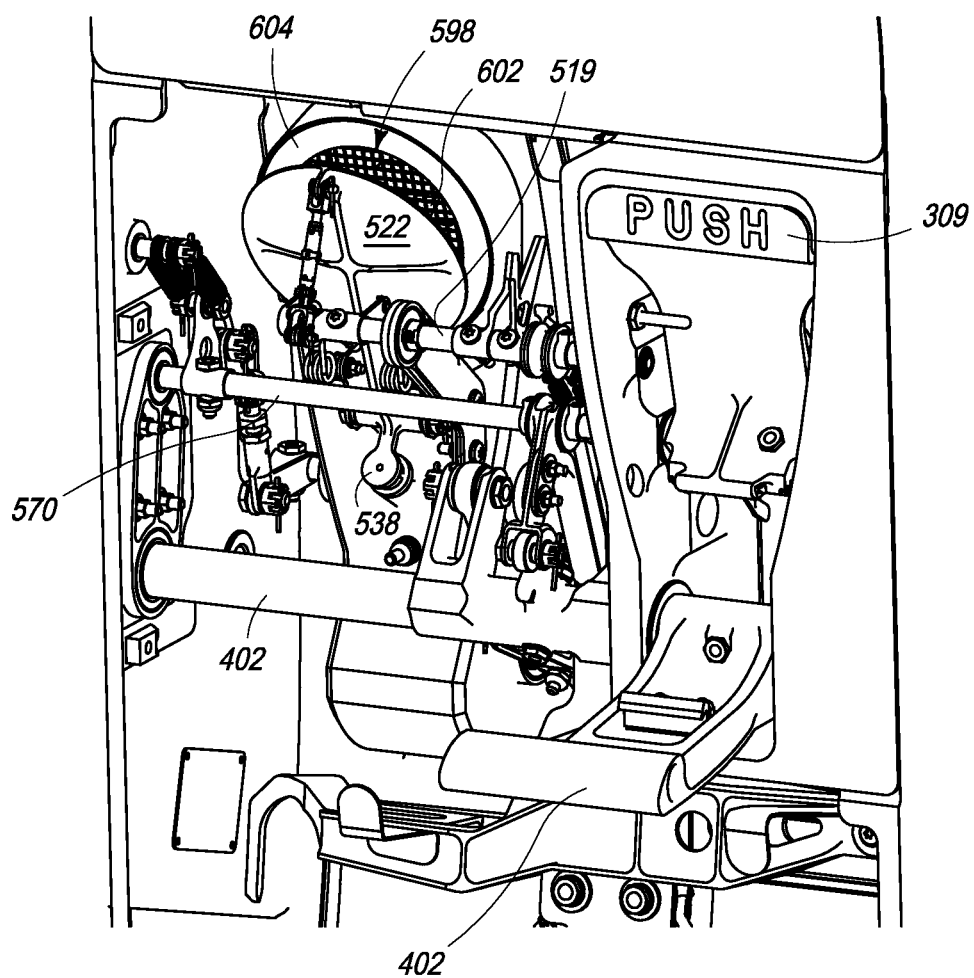
FIG. 6 is a perspective view of the FIG. 5 embodiment for the inboard door handle assembly of the present invention, taken from a different angle than that shown in FIG. 5 where the vent door is in an open position.

It is an advantage that pressure vent door 522 be dramatically snapped open from the closed position shown in FIGS. 7A-D into the second "opened position" shown in FIG. 6. More specifically, the systems controlling the pivoting of pressure vent door 522 are adapted such that the door opens before the disengagement of the door latches 214 upon opening, and also so that the vent door 522 will only sealingly close if the latches 214 are completely secured in the surrounding receptacles (not shown) in the housing structure around the aircraft door.

This is accomplished using an over-center system which operates based on the angular position of shaft 519, and also uses a magnet 540 as an additional retaining component. See FIG. 7C. In terms of specifics, adjacent collars 826 on the shaft 519 include downwardly-depending spring-driven split levers 516 which are connected to wire portions 830 of laterally displaced tandem torsion springs 832. Each spring 530 has a coil portion 832 and a lower wire 533. The lower wires 533 are secured into the same outwardly extending flange 531 of the frame that is used to support both ends of the short axle 536 that the door 522 pivots on. Each spring is under compression such that it has ends that push outward against the outermost end of each split lever end 516, and against the pivot mount 524 on frame 531 at the other end.

Shaft 536 includes an outwardly extending tang 538 used to support a magnet 540 underneath. Magnet 540 can be either engaged with or angularly displaced from a metallic receiving pad 542 on the frame.

Figure 8:
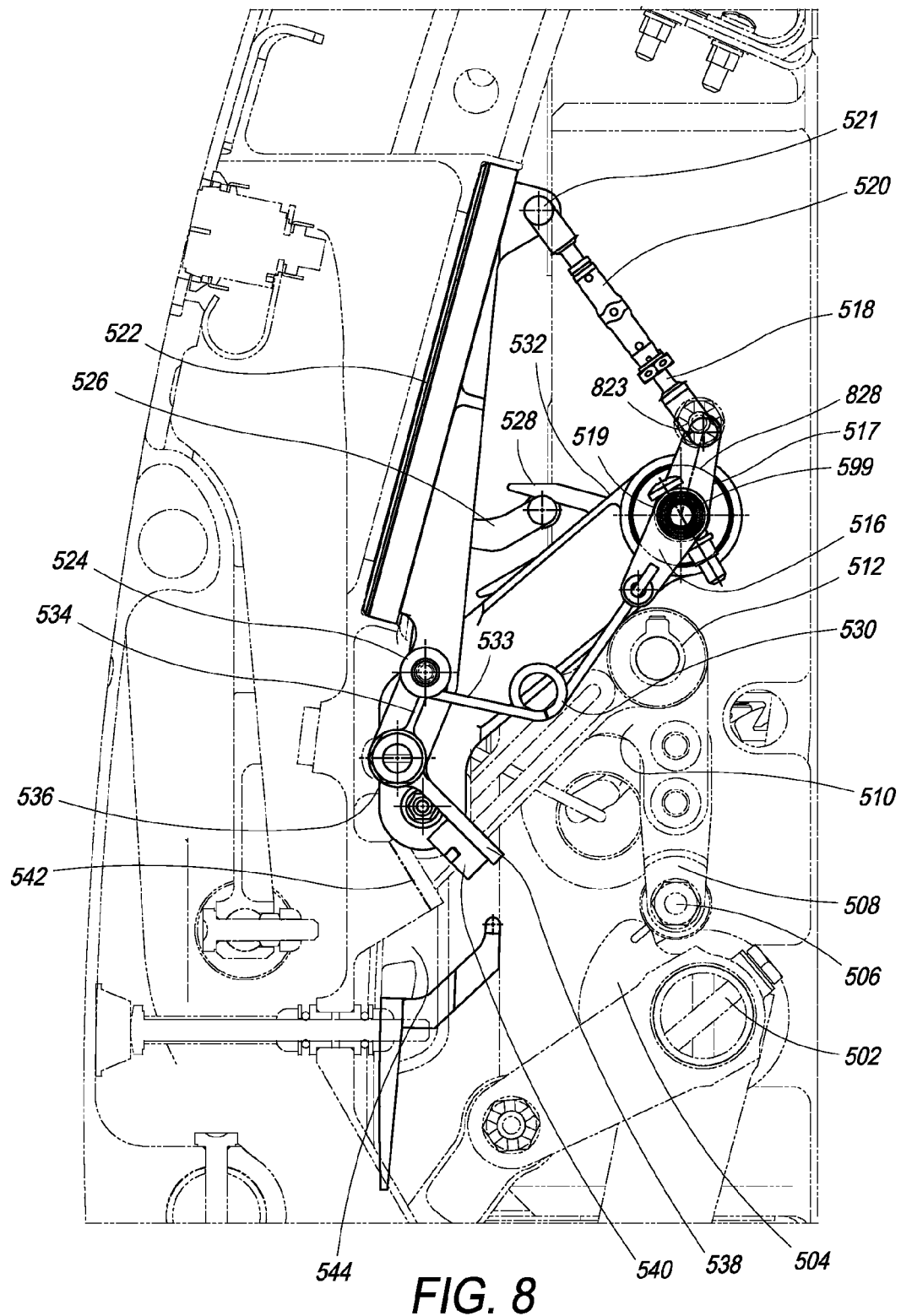
FIG. 8 is a side view of the door vent systems from inside showing the over-center relationship used to open and shut the pressure vent door.

When spring-driven levers 516 are in an under-center position shown in FIGS. 7C and 8, the magnet will be angularly displaced form the metallic receiving pad 542 on the frame. When in this state, the pressure vent door 522 is maintained in closed position.

But whether magnet 540 is displaced from or engaged with pad 542 will depend on handle activation. More specifically, by pulling down either of inboard handle lever 311 or outboard handle lever 211 will cause magnet 540 to engage pad 542 and keep pressure vent door 522 from reclosing absent ample contrary forces. The magnet function retains the vent door assembly in the open position if there are any mechanical failures that prevent the system from closing it due to any failures then existing mechanical system.

The torsion spring 530 works in concert with the magnet arrangement in providing two maintainable states.

Initial Closed State.

In a first closed state, shown in FIGS. 1-8, the handles 211 and 311 are in closed position (as shown in FIGS. 1-5), and thus, vent door 522 is closed. In this state, the torsion springs, in an under-center position, are pushing against levers 516 such that they cause shaft 519 to cause integrated levers 828 to push member 520 against the door. The influence the torsion springs have on the system can best be understood in looking at both FIGS. 7C and 8.

Referring first to FIG. 8, whether the torsion springs tend to open or close door 522 is dependent on the angular position of levers 516. If the angular position of levers 516 is counter-clockwise (see FIG. 8) of an invisible center line (not shown) between the hinged attachment location 524 on the bottom of each spring and the center axis 599 of shaft 519, then the springs 530 will be "under-center." If, however, the angular position of levers 516 is clockwise past this invisible center line, the spring will be "over-center." Whether springs 530 are under-center (as shown in FIG. 8) or under-center (as in FIG. 6) will determine which way the springs compel the rotation of shaft 519.

In FIG. 8, levers 516 are shown as being under-center, in that they are not clockwise past the center line between spring attachment 524 and center axis 599 of shaft 519. Because of that, the forces outward against levers 516 will compel the door shut, and the magnet 540 will be remain displaced from receiving pad 542 unless some action is taken.

Transitioning to an Open State.

When either of the handles 211 or 311 is pulled down, the levers 516 on shaft 519 will move clockwise from the position shown in FIG. 8. When the center axii of levers 516 (when looking in cross section) are rotated clockwise past the invisible line between the center of axis 599 and spring connection points 524, this causes the springs 530 to be over-center. As a consequence, the forces provided by levers 516 will cause rotation of integrated levers 824 away from the vent door 522 putting member 520 in tension. This tension pulls against the top of pressure vent door 522, causing it to pivot out on its axle 536. At the same time, tang 530 rotates such that magnet 540 is magnetically compelled towards receiving pad 542. Even incremental movement of the magnet 540 towards the pad 542 increases the forces to the point that the initial tension created by the springs 530 being over-center is enough to snap open the door dynamically causing an almost instant pressure release. The magnet-to-pad retention forces, along with the over-center state of the springs, will keep the system in the open state until the levers (211 and 311) are returned to closed state by a user.

The extent to which levers 211 or 311 must be pulled before the venting process begins is not that great. Thus, the venting would be begin well before the levers are fully opened, e.g., as is lever 211 in FIG. 9, but rather, shortly after being articulated outside of the latching mechanism. That door 522 opens so suddenly is because the springs 530 and levers 516 are oriented such that they create the over-center state (relative the center line) before the door latches 214 (see FIG. 4) are removed from the receptacles (not shown) in the surrounding door housing so that the cabin pressure is released before the door will open.

Figure 10:
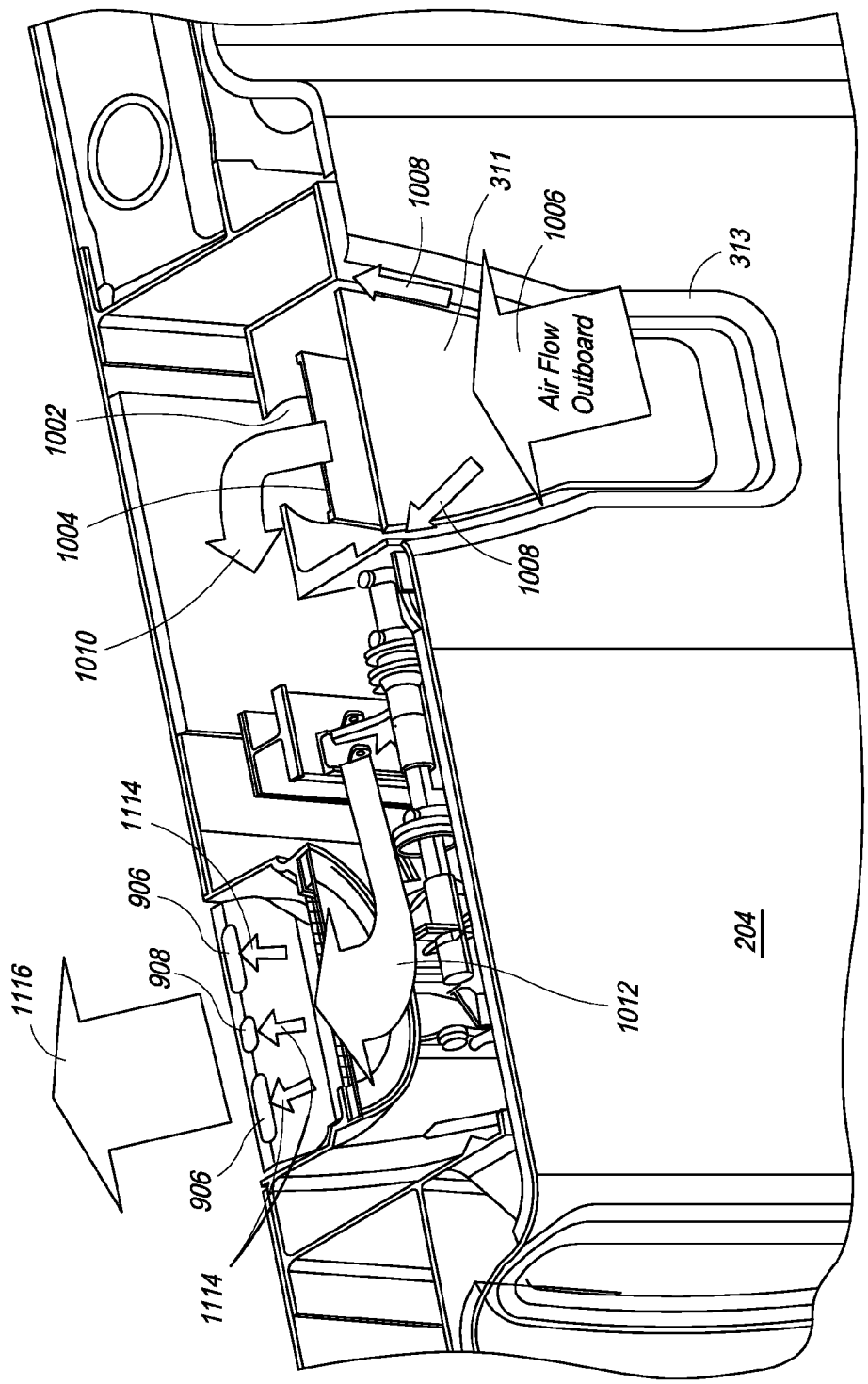
FIG. 10 is a broken out view of the vent system internals showing air flow paths created through the handle assemblies.
Figure 11:
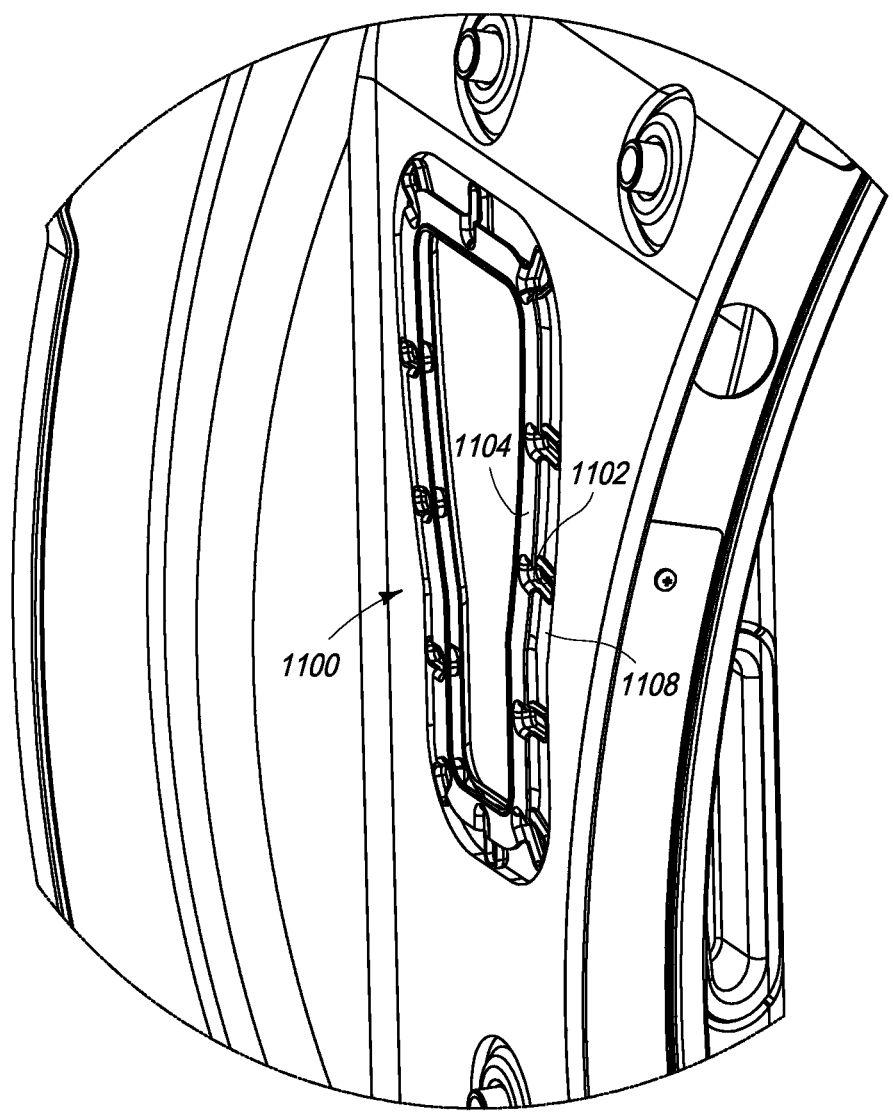
FIG. 11 shows a view of a vented interior handle frame, and more specifically, how handle surrounding air passageways are created to aid in venting.
Figure 12:
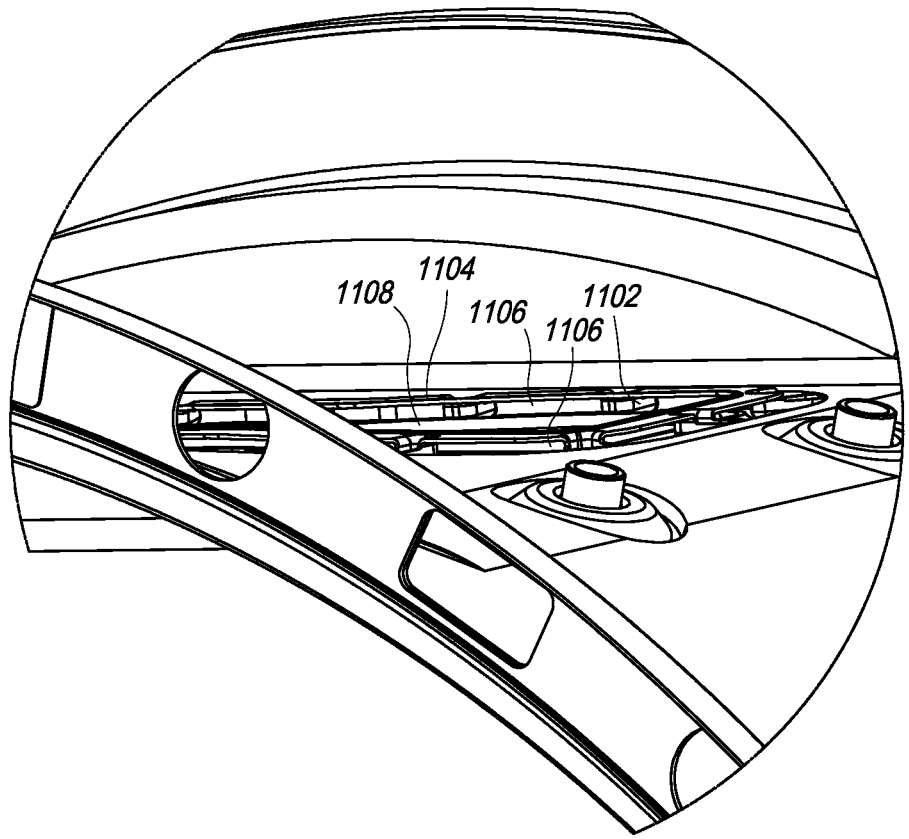
FIG. 12 shows the interior handle frame from an angle in which the air passageways are visible.

Referring to FIG. 10, upon the opening of the pressure vent door, a body of air 1006 is allowed to escape from the inside of the aircraft cabin to the outside environment. Of the airflow paths shown in FIG. 10, outboard airflow 1008 occurs around the inboard handle assembly through a door cover assembly vent dam system 1100 (see FIGS. 11 and 12). System 1100 increases the airflow in and around the handle lever 311 and release pawl 309 into the inboard handle assembly. The system comprises a number of standoffs 1102 which are integral with a housing face 1104. The standoffs 1102 create a plurality of venting slots 1106 which will allow the additional airflow referred to above.

Once the air has traveled into the lever housing, the flow 1010 escapes though an aperture 1002 existing in a back wall 1004 of the handle housing. From there, the air continues along a path 1012 and then a small fraction of the air escapes as subpaths 1114 going out of a central aperture 908 and two lateral slots 906. Although not shown in FIG. 10, a central aperture 902 (see FIG. 9) exhausts most of the air from path 1012. The total air released is symbolically represented by exhausted flow arrow 1116.

FIG. 6 which shows the pressure vent door 522 in completely open position, reveals the structural details existing during ventilation from inside the aircraft cabin. Referring to FIG. 6, a mesh screen 602 is provided inside of where the pressure vent member 522 meets a gasketed orifice 598. Screen 602 prevents the passage of larger contaminants which might cause mechanical or other problems if allowed to penetrate into the door system internals from the environment outside the aircraft. When the system is in open mode as shown in FIG. 6, this mesh screen 602 can be seen.

Figure 9:
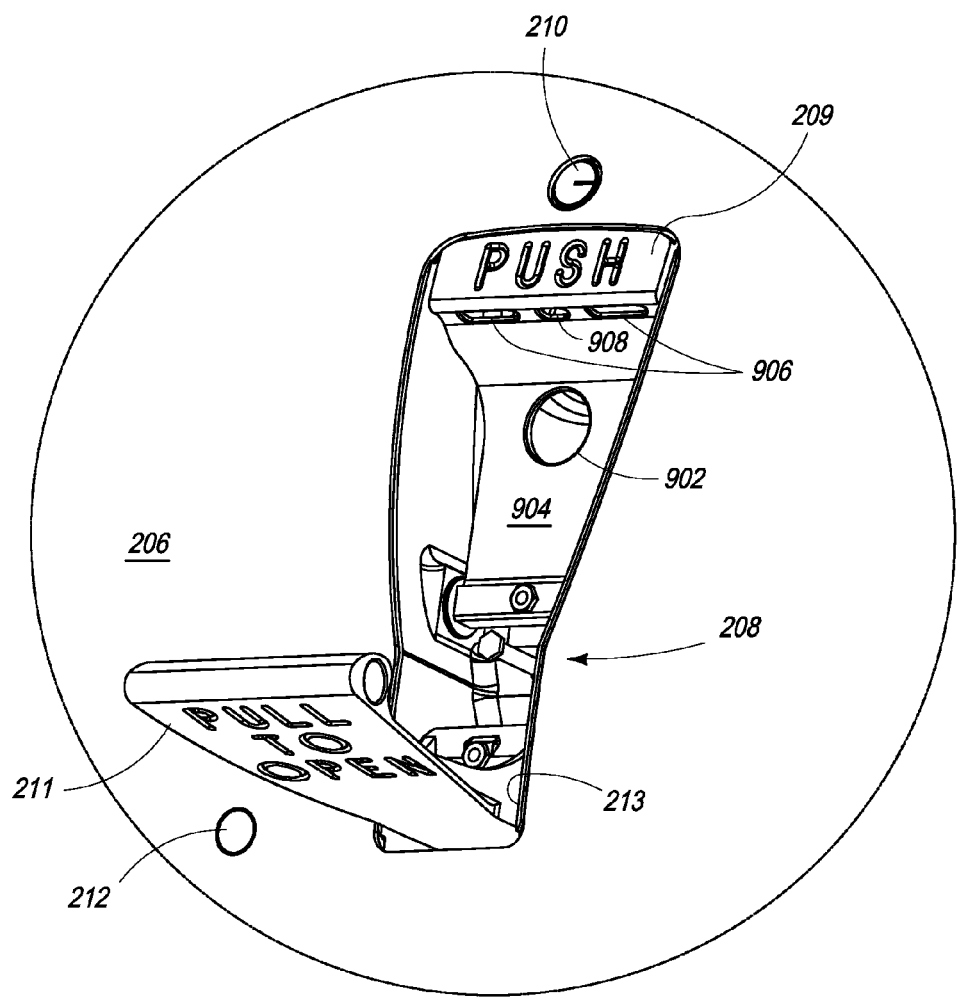
FIG. 9 is a perspective view of the outboard door handle assembly of the present invention where the outboard handle is in an open position.

FIG. 9 shows an outside view of the outboard handle assembly 106 where lever 211 has been pulled down. As can be seen in the figure, the air releasing main central aperture 902, not visible in FIG. 10, is shown here. It is provided in face of the back housing 904. Above that, the lateral elongated apertures 906 on each side of middle aperture 908 are all defined into a surface immediately underneath and inward front face 904 of release pawl 209. These holes (holes 902, 906, 908) enable the flow of pressurized air out of the cabin upon activation of inboard lever 311 or outboard lever 211.

Reclosing of the Vent

When either of the handles (either 211 or 311) are returned from a pulled position (e.g., as shown in FIGS. 6 and 9) towards a latched position (e.g., as seen in FIGS. 1-5 and 7A-D), the above-described opening operations are reversed, which returns the system back to closed mode. More specifically, the reversed rotation of drive shaft 402 causes linkage 403 to rotate outward (see FIG. 7B) causing component 405 to move downward. This causes backbone (spine) 404 to drop back down. The drop of spine 404 causes the lever arrangements 406 (see FIG. 4) to mechanically cause the outward extension of securing latches 214 into the reciprocating holes in the surrounding door housing. Once the securing latches 214 are fully extended into the receiving areas in the surrounding door housing (not shown) aircraft door 102 is securely and sealingly held in the surrounding door jam.

Also resulting from the return of levers 211 and 311 towards latched position is that pressure relief door 522 is shut, sealing off the cabin so that it may be pressurized. When either lever is returned, the now downward moving extended pin 816 backbone 404 releases the catch portions 820/821 and then engages a reverse catch 877. This causes shaft 519 to rotate back to its original (closed) position. This causes the pressure vent door 522 to return to shut position because the extending integrated levers 824 on collars 826 rotate back in putting member 520 in compression. The force from member 520 compels the vent door 522 towards its closed position.

But the reverse operations of the over-center system also have an effect in that they cause the vent door 522 to dramatically snap shut against the receiving gasket 602 (see FIG. 6) only after the door latches 214 have been adequately engaged in the receptacles in the surrounding door housing. The return of shaft 519 to its original "closed mode" position initially overcomes the rotational forces of resistance when the movement of hinged door 522 causes tang 530 to raise lifting magnet 540 off receiving pad 542.

This rotation also causes downwardly-depending spring-driven split levers 516 to move from their current over-center position back towards an under-center position like that shown in FIGS. 7C and 8. More specifically, the angular position of levers 516, upon handle closure, moves counter-clockwise (see FIG. 8) until reaching the invisible center line (not shown) between the hinged attachment location 524 on the bottom of each spring and the center axis 599 of shaft 519. When the springs 530 reach under-center, the torsion forces against levers 516 have an immediate reverse effect on resistance, and the dramatic difference results in an immediate snapping shut of the pressure vent door 522 against the seal 602 (see FIG. 6).

And the timing of this closure occurs because the springs 530 and levers 516 are oriented such that they create an under-center state (relative the center line) only after the door latches 214 (see FIG. 4) are adequately secured in the receptacles (not shown) in the surrounding door housing. Because of this, any human or mechanical failure in closing the aircraft door 102 will cause the pressure vent door 522 to remain open. And when vent door 522 remains open, the pilot, when reaching an appropriate altitude will detect a lack of cabin pressure and take appropriate safety measures.

It should be noted that although the embodiments depicted in this application show a dual spring-driven lever 516 and spring pair 832 arrangement, it is also, in other embodiments, possible to use a single lever and spring. The disclosed embodiments use two to provide stability. But the use of a pair of springs (e.g., pair 832) is not critical. Thus, it is supported that the arrangement would still work with at least one spring-driven lever and a single torsion spring.

In the disclosed embodiments herein, springs 530 are torsional springs installed such that they are compressed, and thus, have ends that compel outward. It should be noted, however, that that other kinds of compressible springs, e.g., helical compression springs or other axially-loaded springs or related devices could be used instead. Thus, the invention should not be limited to any particular device unless specified in the claims.

The pressure vent door 522 will also stay in open position (and thus warn the pilot of problems) in the event of mechanical failures. If, e.g., any of (i) the mechanical equipment used to link the handles 211 and 311 to drive shaft 402; (ii) the backbone 404 or mounted member 816; (iii) reverse catch 877; (iv) levers 516; or other components fail, the pressure vent door 522 will not close because the magnet arrangement will hold it open.

Pawl Lock Assembly (Not Part of Door Vent System)

Another system of components are not relevant to the Door Vent System operations, but are mentioned only so that these parts can be removed from consideration considering the complexity of the systems described here. They are, however, a part of a pawl-lock system that is in the general environment with, but not mechanically involved with the disclosed door vent system. Shaft 570 is used as part of the pawl-lock system. This system works with a locking device 576 which is normally caused to bear against the backbone 404 so that it can engage a catch 572 in situations where one of backbone driving mechanisms 403, 812, and 405 fail, or if shaft 402 fails. Or other failures that might cause the latching/locking mechanisms to open due to upward movement of backbone which could otherwise cause the door to open in flight. This collateral pawl-lock system is designed to prevent against that.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A pressure relief system for an aircraft door, the door having a handle and a spine integral with the aircraft door, the spine being in mechanical communication with the handle and the pressure relief system, the system comprising:
    a pin member spanning laterally between a first side and a second side of at least one mount fastened onto the spine, a central portion of the pin member thus being uninhibited;
    a shaft mechanically connected to a door vent, the shaft having at least one forward catch member attached thereto; and
    a spring which is torqued or compressed by changes made in the angular position of the shaft;
    wherein the at least one catch member engages the pin member when activation of the handle causes the spine to be translated in a first direction a distance greater than zero, causing the shaft to rotate; and
    wherein engagement of the pin member rotates the shaft from an original position, causing at least one lever to rotate from an under-center position wherein the vent door is maintained in closed position to an over-center position compelling the opening of the door vent.

2. The system of claim 1 further comprising:
    a reverse catch which, when the spine is activated by the handle in a second opposite direction, engages the pin member which causes the shaft to rotate back to the original closed-position wherein the at least one lever is in an under-center position, thus causing the vent door to shut.

3. The system of claim 2 comprising:
    a magnet fixed in the door, the magnet offering resistance against the spring in an angular direction opposite to rotation of the shaft, the magnet having a magnetic strength level at which the door vent will be released upon activation of the handle to a given extent, thus snapping the vent door into an open position.

4. A pressure relief system for an aircraft door, the door having a handle and a backbone, wherein the backbone is in mechanical communication with the handle and the pressure relief system, the system comprising:
    a door vent;
    a shaft mechanically coupled to the door vent, the shaft having at least one catch member attached thereto;
    a spring which is torqued or compressed by changes made in the angular position of the shaft;
    a first magnet supported by a tang extending outwardly from the door vent; and
    a second magnet secured to the aircraft door;
    wherein the at least one catch member engages a pin member on the backbone when the backbone is translated a distance greater than zero via activation of the handle, thus causing the shaft to rotate and compelling the door vent open or closed; and wherein the first magnet contacts the second magnet when the vent door is open, the resulting magnetic force being sufficient to maintain the vent door open.

5. The system of claim 4, wherein the first and second magnets are released, and the door vent closed, upon sufficient force being applied to the handle compelling closure of the aircraft door.

6. The system of claim 4, wherein rotation of the shaft in a first direction causes the spring to snap from an under-center position when the door vent is closed, to an over-center position causing the door vent to open; and wherein rotation of the shaft in a second direction cause the spring to snap from an over-center position when the door vent is open to an under-center position causing the door vent to close.

7. A pressure relief system for an aircraft door, the door having a handle mechanically coupled to a backbone of the aircraft door, wherein:

the door handle, when activated, causes rotation of a first shaft, the first shaft being mechanically connected to the backbone;

the rotation of the first shaft causes a pressure vent to open;

a spring closes the pressure vent when in one of an under-center or over-center position; and the spring opens the pressure vent when in an other of the under-center or over-center position.

8. The system of claim 7, wherein the pressure vent is on a pivot, and a magnet holds the pressure vent in an open position after the handle is pulled, and releases the pressure vent only when the handle is returned and the door is closed.

\* \* \* \* \*